United States Patent
Jain et al.

(10) Patent No.: US 7,801,555 B2
(45) Date of Patent: Sep. 21, 2010

(54) USER OPERATION OF A WIRELESS DEVICE CAPABLE OF COMMUNICATING WITH MULTIPLE NETWORKS

(75) Inventors: Nikhil Jain, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 689 days.

(21) Appl. No.: 11/187,775

(22) Filed: Jul. 22, 2005

(65) Prior Publication Data

US 2007/0021143 A1 Jan. 25, 2007

(51) Int. Cl.
*H04M 1/00* (2006.01)
(52) U.S. Cl. .................. 455/552.1; 455/426.1; 455/566; 455/553.1
(58) Field of Classification Search ............ 455/426.1, 455/552.1, 420, 414.1, 88.431, 73, 550.1, 455/566.1, 566, 553.1, 90.3, 186.2; 375/130, 375/219
See application file for complete search history.

(56) References Cited

U.S. PATENT DOCUMENTS

| | | | | |
|---|---|---|---|---|
| 5,758,295 | A * | 5/1998 | Ahlberg et al. | 455/566 |
| 5,930,725 | A * | 7/1999 | Kornby | 455/552.1 |
| 6,697,415 | B1 * | 2/2004 | Mahany | 375/130 |
| 2004/0180622 | A1 * | 9/2004 | Godfrey | 455/41.2 |
| 2004/0219948 | A1 | 11/2004 | Jones et al. | |
| 2006/0270449 | A1 * | 11/2006 | Kim et al. | 455/552.1 |
| 2008/0019333 | A1 * | 1/2008 | Kharia et al. | 370/338 |
| 2008/0020759 | A1 * | 1/2008 | Nagarajan et al. | 455/433 |

FOREIGN PATENT DOCUMENTS

| | | |
|---|---|---|
| EP | 1241905 | 9/2002 |
| WO | 2004030391 | 4/2004 |
| WO | 2004064308 | 7/2004 |

OTHER PUBLICATIONS

International Search Report and Written Opinion—PCT/US06/028340, International Searching Authority—European Patent Office, Nov. 6, 2006.

* cited by examiner

*Primary Examiner*—Tuan A Pham
(74) *Attorney, Agent, or Firm*—Florin Corie

(57) ABSTRACT

A wireless device and method of operating the device is disclosed. The wireless device is capable of communicating with multiple networks. The wireless device includes a transceiver configured to communicate with either one of two networks over a wireless medium. Each of the two networks has a different air interface protocol. The wireless device also includes a user interface having a keypad, display, and/or similar devices. A processor in the wireless device may be configured to select either one of the two networks for wireless communications with the transceiver. In at least one embodiment, the processor is configured to communicate with the transceiver using the air interface protocol for the selected network, and communicate with the user interface using a root protocol regardless of the network selected.

38 Claims, 3 Drawing Sheets

USER OPERATION OF A WIRELESS DEVICE CAPABLE OF COMMUNICATING WITH MULTIPLE NETWORKS

BACKGROUND

1. Field

The present disclosure relates generally to telecommunications, and more particularly, to the operation of a wireless device capable of communicating with multiple networks.

2. Background

The demand for wireless information services has led to the development of an ever increasing number of wireless networks. CDMA2000 1x is just one example of a wireless network that provides wide area telephony and data services. CDMA2000 1x is a wireless standard promulgated by the Third Generation Partnership Project 2 (3GPP2) using code division multiple access (CDMA) technology. CDMA is a technology that allows multiple users to share a common communications medium using spread-spectrum processing.

A competing wireless network that is commonly employed in Europe is Global System for Mobile Communications (GSM). Unlike CDMA2000 1x, GSM uses narrowband time division multiple access (TDMA) to support wireless telephony and data services.

Some other wireless networks include General Packet Radio Service (GPRS) which supports high speed data services with data rates suitable for e-mail and web browsing applications, and Universal Mobile Telecommunications System (UMTS) which can deliver broadband voice and data for audio and video applications.

These wireless networks can generally be thought of as wide area networks employing cellular technology. Cellular technology is based on a topology in which the geographic coverage region is broken up into cells. Within each of these cells is a fixed base transceiver station (BTS) that communicates with wireless users. A base station controller (BSC) is typically employed in the geographic coverage region to control the BTSs and route communications to the appropriate gateways for the various packet-switched and circuit-switched networks.

As the demand for wireless information services continue to increase, wireless devices are evolving to support integrated voice, data, and streaming media while providing seamless network coverage between wide area cellular networks and wireless local area networks (LAN). Wireless LANs generally provide telephony and data services over relatively small geographic regions using a standard protocol, such as IEEE 802.11, Bluetooth, or the like. The existence of wireless LANs provides a unique opportunity to increase user capacity in a wide area cellular network by extending cellular communications to the unlicensed spectrum using the infrastructure of the wireless LAN.

In general, a cellular wireless device capable of providing seamless coverage over a WLAN may operate differently depending on which network it is connected to. This is due, in part, to each network's use of its own unique protocol for communicating with the wireless device. By way of example, a user on a wireless device connected to a cellular network may initiate a telephone call by entering the phone number and then pressing a designated key on the device. The same wireless device connected to a WLAN may require the user to press a different key to initiate the call once the phone number is entered. While the call is in progress on the cellular network, a tone received by the user may indicate another incoming call. The user may then place the active call on hold while answering the other incoming call by pressing the appropriate key. When connected to the WLAN, the user may need to press a different key in response to multiple tones to answer the incoming call. Thus, a user operating a wireless device in this geographic landscape may be need to know multiple procedures for the same service. This places a heavy burden on the user. This burden may be reduced with a wireless device that works the same way regardless of the network connection.

SUMMARY

One aspect of a wireless device capable of communicating with multiple networks is disclosed. The wireless device includes a transceiver configured to communicate with either one of two networks over a wireless medium, each of the two networks having a different air interface protocol. The wireless device also includes a user interface, and a processor configured to select either one of the two networks for wireless communications with the transceiver. The processor is further configured to communicate with the transceiver using the air interface protocol for the selected network, and communicate with the user interface using a root protocol regardless of the network selected.

Another aspect of a wireless device capable of communicating with multiple networks is disclosed. The wireless device includes a transceiver configured to communicate with either one of two networks over a wireless medium, each of the two networks having a different air interface protocol. The wireless device also includes a user interface having a keypad and a display, and a processor configured to select either one of the two networks for wireless communications with the transceiver. The processor is further configured to support a plurality of network services accessible in substantially the same way by a user through the keypad and display regardless of the network selected.

An aspect of computer readable media is disclosed. The wireless device includes a user interface and a transceiver configured to communicate with either one of two networks over a wireless medium, each of the two networks having a different air interface protocol. The computer readable media embodies a program of instructions are executable by the processor to perform a method that includes selecting either one of the two networks for wireless communications with the transceiver, communicating with the transceiver using the air interface protocol for the selected network, and communicating with the user interface using a root protocol regardless of the network selected.

Another aspect of computer readable media is disclosed. The wireless device includes a user interface having a keypad and display, and a transceiver configured to communicate with either one of two networks over a wireless medium, each of the two networks having a different air interface protocol. The computer readable media embodies a program of instructions are executable by the processor to perform a method that includes selecting either one of the two networks for wireless communications with the transceiver, and supporting a plurality of network services accessible in substantially the same way by a user through the keypad and display regardless of the network selected.

Another aspect of a wireless device capable of communicating with multiple networks is disclosed. The wireless device includes a user interface and a transceiver configured to communicate with either one of two networks over a wireless medium, each of the two networks having a different air interface protocol. The wireless device also includes means for selecting either one of the two networks for wireless communications with the transceiver, and means for communicating with the transceiver using the air interface protocol for the selected network, and communicating with the user interface using a root protocol regardless of the network selected.

A further aspect of a wireless device capable of communicating with multiple networks is disclosed. The wireless device includes a keypad, display, and transceiver configured to communicate with either one of two networks over a wireless medium, each of the two networks having a different air interface protocol. The wireless device also includes means for selecting either one of the two networks for wireless communications with the transceiver, and means for supporting a plurality of network services accessible in substantially the same way by a user through the keypad and display regardless of the network selected.

An aspect of a method for communicating from a wireless device is disclosed. The wireless device includes a user interface and a transceiver configured to communicate with either one of two networks over a wireless medium, each of the two networks having a different air interface protocol. The method includes connecting the wireless device to a first one of the two networks, supporting a plurality of network services accessible by a user through the keypad and display, switching the wireless device to a second one of the two networks, and providing the network services accessible in substantially the same way by the user through the keypad and display.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings wherein.

DETAILED DESCRIPTION

Figure 1:
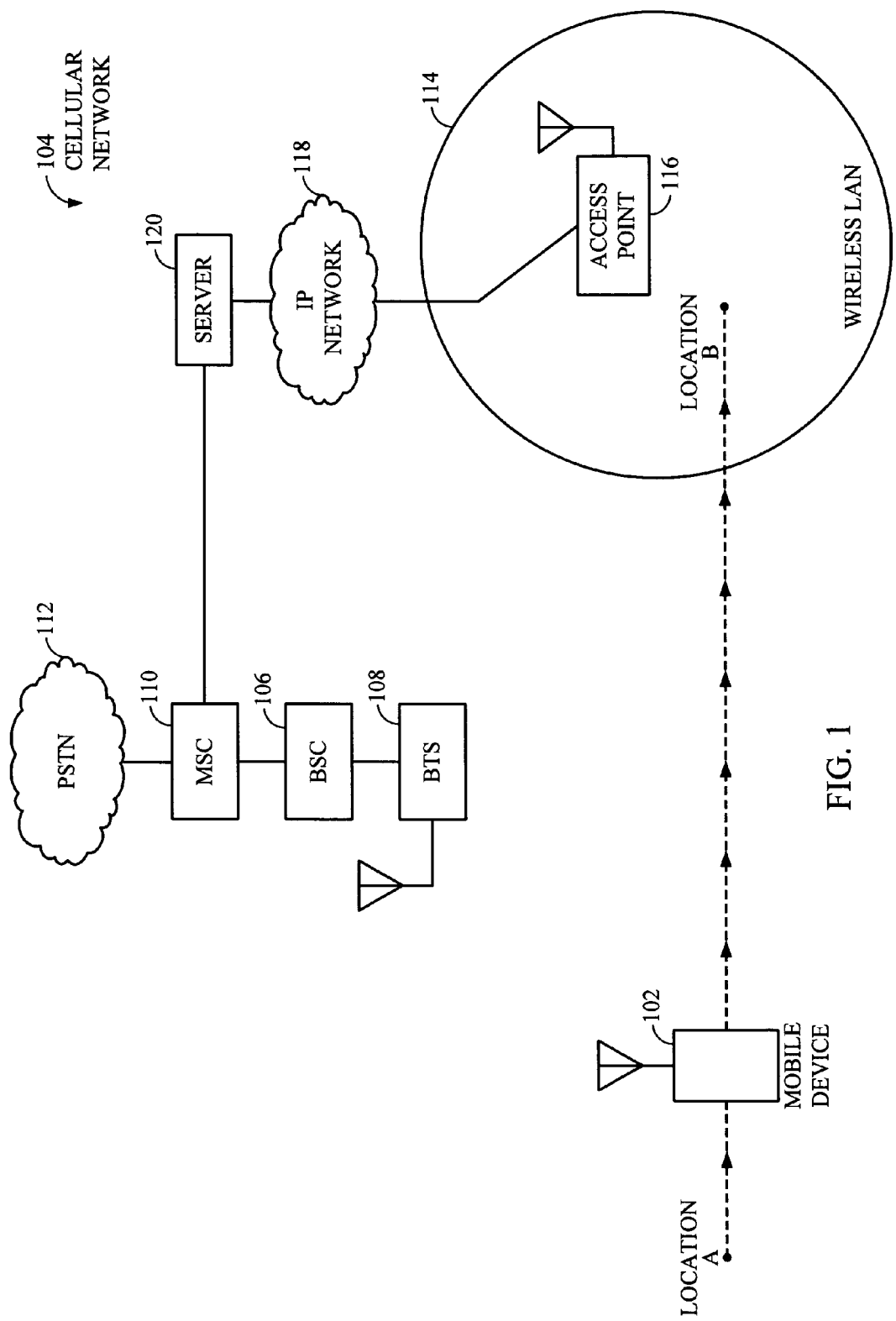
FIG. 1 is a conceptual block diagram of an embodiment of a wireless communications system.

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the following detailed description, the manner in which a user interacts with multiple networks will be described in the context of a wireless communications device. The wireless device may be equipped to access various services provided by different networks in a way that is transparent to the user. By way of example, the user can place calls, correct dialing mistakes, redial calls, receive calls, utilize call waiting, forward calls, set-up three-way calling, use voice mail, text message, access the Internet, and perform many other similar functions without the need to know which network is being used.

The wireless communications device may include a user interface that is menu driven. In the menu driven user interface, on-screen options can be presented to the user in the form of a main menu. From the main menu, the user can select on-screen options for selecting particular network services or other features. Once an on-screen option is selected by the user, various selections may be presented to the user in a sub-menu format. By way of example, a user can navigate through the menu selections to place calls from his or her address book, speed dial, access voice mail, use text messaging, access the Internet, select graphics for the display, access various tools, and perform many other similar functions. The wireless device may be configured such that user can make menu selections in the same way regardless of which network the wireless device is connected to.

To illustrate the manner in which a user interacts with multiple networks, the wireless communications device will be described operating in a wide area cellular network with one or more wireless LANs dispersed throughout the cellular coverage region. The wireless communications device may be any suitable device capable of wireless telephony or data communications, such as a cellular phone designed for operation in a CDMA2000 1x network. The wireless communications device may be capable of employing any suitable protocol for accessing a wireless LAN, including, by way of example, IEEE 802.11. While various techniques for accessing network services may be described in the context of a cellular phone capable of communicating with an IEEE 802.11 network, those skilled in the art will readily appreciate that these techniques can be extended to other wireless communication devices capable of accessing multiple networks. For instance, these techniques may be applied to a wireless communications device capable of switching between a CDMA2000 1x network and a GSM network. Accordingly, any reference to a wireless cellular device capable of communicating with an IEEE 802.11 network, or any other specific embodiment, is intended only to illustrate various aspects of the present invention, with the understanding that these aspects have a wide range of applications.

FIG. 1 is a conceptual block diagram of an embodiment of a wireless communications system. A wireless device 102 is shown moving through a wide area cellular network 104 by a series of broken lines. The cellular network 104 includes a BSC 106 supporting a number of BTSs dispersed throughout the cellular coverage region. A single BTS 108 is shown in FIG. 1 for simplicity of explanation. A mobile switching center (MSC) 110 may be used to provide a gateway to a public switched telephone network (PSTN) 112. Although not shown in FIG. 1, the cellular network 104 may employ numerous BSCs each supporting any number of BTSs to extend the geographic reach of the cellular network 104. When multiple BSCs are employed throughout the cellular network 104, the MSC 110 may also be used to coordinate communications between the BSCs.

The cellular network 104 may also include one or more wireless LANs dispersed throughout the cellular coverage region. A single wireless LAN 114 is shown in FIG. 1. The wireless LAN 114 may be an IEEE 802.11 network, or any other suitable network. The wireless LAN 114 includes an access point 116 for the wireless device 102 to communicate with an IP network 118. A server 120 may be used to interface the IP network 118 to the MSC 110, which provides a gateway to the PSTN 112.

As the wireless device 102 travels through the cellular coverage region, it will attempt to access either the cellular network 104 or the wireless LAN 114. The decision to access a particular network may depend on a variety of factors, such as the specific application, the particular infrastructure, the overall design constraints, and/or the quality of service required. One possible implementation is to configure the wireless device 102 to access the wireless LAN 114 whenever a minimum quality of service can be achieved. To the extent the wireless LAN 114 can be used to support wireless telephony and data communications, valuable cellular bandwidth may be freed up for other wireless users.

Figure 2:
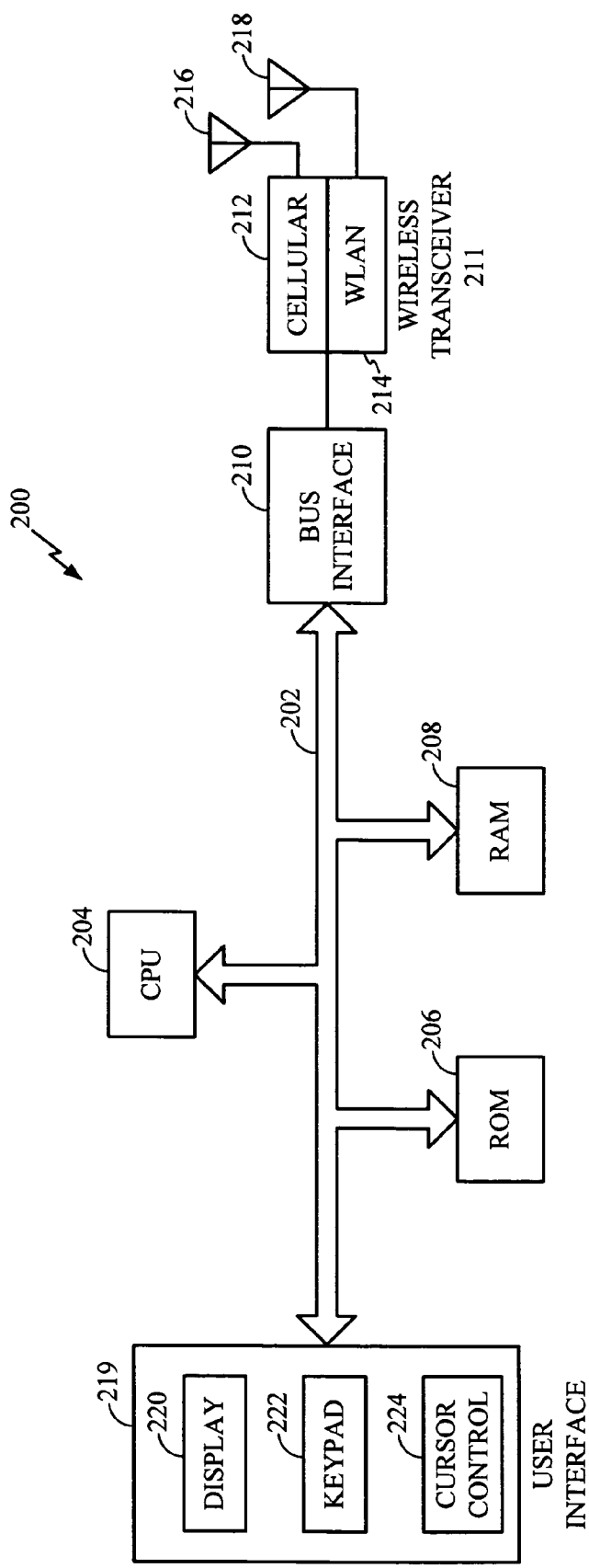
FIG. 2 is an example of a hardware configuration for a software based processing system in a wireless communications device.

Network access can be managed with a software based processing system, or any other suitable configuration. An example of a hardware configuration for a software based processing system is shown in FIG. 2. The processing system 200 may be implemented with a number of components connected by a bus 202. A central processing unit (CPU) 204 coupled to the bus 202 may provide a platform to run software programs that, among other things, manage access to the cellular network and the wireless LANs. The processing system 200 may include additional processors (not shown) coupled to the bus 202 that allow the CPU 204 to offload tasks. The CPU 204 may be a single processor as shown in FIG. 2, or alternatively, distributed across multiple processing entities. The exact configuration used for any particular application will be a matter of rudimentary hardware design, with the understanding that the inventive concepts described throughout this disclosure are not dependent on the hardware configuration.

The processing system 200 may also include non-volatile memory 206 coupled to the bus 202. The non-volatile memory 206 may be implemented as read only memory (ROM) as shown in FIG. 2, or any other type of suitable permanent storage medium. The ROM 206 may be used to store the operating system and applications used by the CPU 204. When power is applied to the wireless device, the basic input/output system (BIOS) and the operating system stored in the ROM 206 are loaded into a temporary storage medium 208 coupled to the bus 202. The temporary storage medium 206 may be implemented as random access memory (RAM), or any other suitable volatile memory device. Applications that are launched by the CPU 202 and files needed in such applications may also be loaded into the RAM 208. The memory architecture for any particular application may vary to meet the overall performance requirements of the CPU or other processing entities. Those skilled in the art will appreciate that the inventive concepts described throughout this disclosure are independent of the memory architecture.

The processing system 200 may also include a wireless transceiver 211 connected to the bus 202 through a bus interface 210. The wireless transceiver 211 is shown in FIG. 2 with a cellular block 212 and a wireless LAN block 214. In at least one embodiment of the processing system 200, the cellular block 212 is capable of supporting CDMA2000 1x communications, and the wireless LAN block 214 is capable of supporting IEEE 802.11 communications. The transceiver blocks 212, 214 may be separate as shown in FIG. 2, or integrated into a single block. Each transceiver 212, 214 is shown with a separate antenna 216, 218, respectively, but the transceivers 212, 214 could share a single broadband antenna. Each antenna 216, 218 may be implemented with one or more radiating elements.

The processing system 200 may be coupled through the bus 202 to a user interface 219. The user interface 219 may include a display 220, such as a liquid crystal display (LCD). The user interface 219 may also include a number of input devices, such as a keypad 222 and a cursor control 224 for communicating with the CPU 202 and controlling cursor movement on the display 220.

Figure 3:
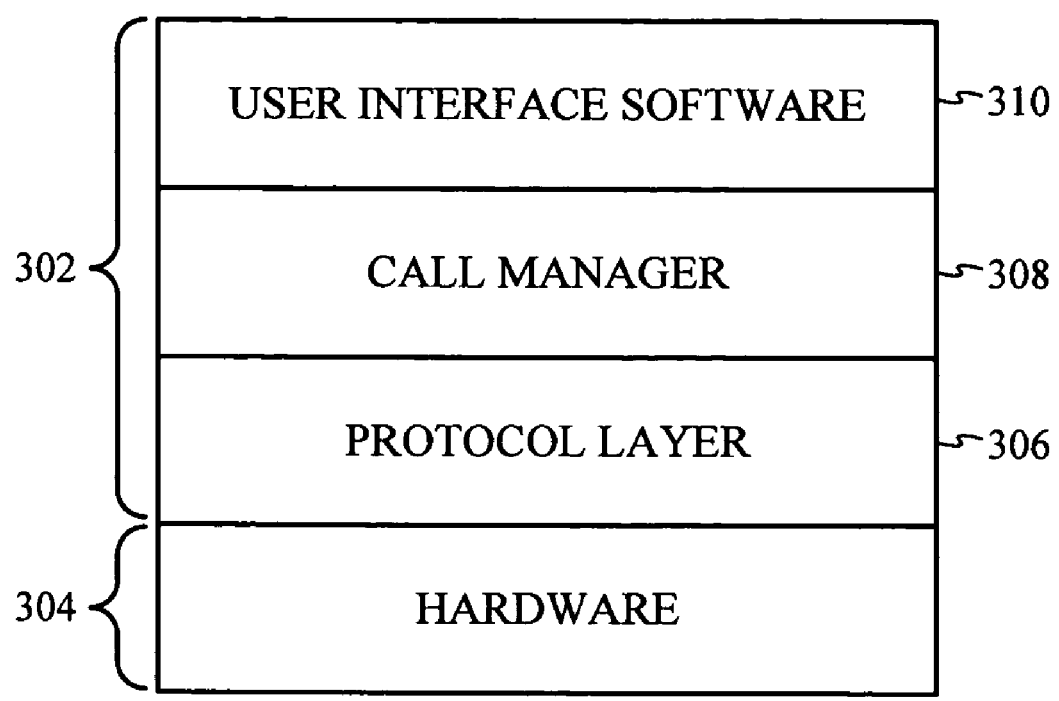
FIG. 3 is a functional block diagram illustrating a multi-layer software architecture for the processing system of FIG. 2.

FIG. 3 is a functional block diagram illustrating a multi-layer software architecture for the processing system. The software architecture includes a software platform 302 running on hardware 304. The software platform 304 may be a BREW operating system developed by Qualcomm, Inc., or any other operating system or application execution environment. The software platform 302 may be used to support a protocol layer 306, a call manager 308, and user interface software 310. The hardware 304 can be a CPU as shown in FIG. 2, or any other suitable hardware.

User interface software 310 is a software program, or set of programs, that sits as a layer above the call manager 308. The software programs can be applications that support various functions such as placing calls, correcting dialing mistakes, redialing calls, receiving calls, call waiting, call forwarding, set-up three-way calling, speed dial, voice mail, text messaging, Internet access, graphics, tools, and many other similar functions. The user interface software 310 is also responsible for generating menu and sub-menus presented to the display.

The call manager 308 may be used to manage access to various networks. In the wireless device described thus far, the call manager 308 is responsible for establishing a connection with either the cellular network or the wireless LAN. The call manager 308 may perform this function using any suitable selection algorithm. By way of example, the call manager 308 may consider cost, bandwidth, network traffic, or other criteria to select a network. As discussed earlier, the call manager 308 may be configured to access the wireless LAN if a minimum quality of service can be achieved. Otherwise, the call manager 308 will attempt to access the cellular network. The call manager 308 may also be responsible for handing off the wireless device from one network to the other as the wireless device travels through the cellular network, thereby causing the service quality of the wireless LAN to change.

Once the call manager 308 selects the appropriate network, it signals the protocol layer 306. The protocol layer 306 provides the appropriate air interface based on the signaling from the call manager 308. In the wireless device described thus far, the protocol layer 308 can support both a CDMA2000 1x air interface and an IEEE 802.11 air interface. The protocol layer 306 may also be used to provide protocol independent responses from the selected network to the user interface software 310. As a result, the user interface software 310 will operate in exactly the same way regardless of the network that the wireless device is connected to. Thus, a user who has become accustom to initiating a telephone call by entering the phone number and pressing a designated key can continue to do so as the wireless device is handed off between networks. When the user selects on-screen options, the menu and sub-menu formats will remain unchanged. The user will navigate through the menus using the same keypad manipulations for all networks that the wireless device accesses as it travels through a wireless network. The look and feel of the wireless device will remain unchanged as the air-interface deployed by the protocol layer 306 changes.

The protocol layer 306 may be implemented in a number of ways. In one embodiment of the protocol layer, a root protocol is preconfigured in the wireless device. By way of example, the root protocol may be CDMA2000 1x. In this example, the protocol layer translates communications between the root protocol of the user interface software 310 and the air interface protocol for the selected network. More specifically, the protocol layer 306 determines whether a translation between the CDMA2000 1x protocols and IEEE 802.11 air interface is required based on signaling from the call manager 308. If the call manager 308 selects the wireless LAN, then the protocol layer 306 will perform the appropriate translation by means well known in the art. Otherwise, the CDMA2000 1x communications can pass through the protocol layer 306 unmolested.

In an alternative embodiment, the protocol layer 306 may be configured to tunnel root protocol communications between the user interface and the selected network using the air interface protocol for the selected network. If the root protocol is CDMA2000 1x and the call manager 308 selects a CDMA2000 1x network, then the communications can pass through the protocol layer 306 in much the same way as described in connection with the previous embodiment. However, if the call manager 308 selects a different network, such as an IEEE 802.11 network, then the CDMA2000 1x communications between the wireless device and the network may be tunneled through the appropriate air interface protocol. In particular, the protocol layer 306 encapsulates communications from the user interface 308 before transmission to the network. The protocol layer 306 also strips the appropriate headers from communications received from the network before providing them to the user interface software 308. In this embodiment of the protocol layer 308, the server on the other end of the IP network performs a similar function, thus communicating with the MSC using the CDMA2000 1x protocol.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A wireless device capable of communicating with multiple networks, comprising:
   a transceiver configured to communicate with either one of two networks over a wireless medium, each of the two networks having a different air interface protocol, wherein one of the different air interface protocols is configured as a root protocol;
   a user interface; and
   a processor configured to select either one of the two networks for wireless communications with the transceiver, the processor further being configured to communicate between the transceiver and the selected network using the air interface protocol for the selected network, and to further communicate between the transceiver and the user interface using the root protocol of the user interface regardless of the air interface protocol used for communication with the selected network, wherein the processor is further configured to tunnel root protocol communications between the user interface and the selected network using the air interface protocol for the selected network.

2. The wireless device of claim 1 wherein the user interface include a keypad and display, the processor being configured to support a plurality of network services accessible in substantially the same way by a user through the keypad and display regardless of the network selected.

3. The wireless device of claim 2 wherein the processor is further configured to provide access to at least some of the network services by presenting one or more menus to the display, the format of the one or more menus being substantially the same regardless of the network selected, and wherein the user interface is configured to allow the user to navigate through the one or more menus using the keypad in substantially the same way regardless of the network selected.

4. The wireless device of claim 1 wherein the root protocol comprises the air interface protocol for one of the networks.

5. The wireless device of claim 1 wherein the processor is further configured to translate communications between the root protocol of the user interface and the air interface protocol of the selected network.

6. The wireless device of claim 1 wherein to tunnel root protocol communications the processor is further configured to encapsulate communications from the user interface, in the air interface protocol for the selected network for transmission to the selected network and to strip headers from received communications from the selected network before providing the received communications to the user interface.

7. The wireless device of claim 1 wherein the two networks comprise a cellular network having a cellular coverage region and a wireless LAN in the cellular coverage region.

8. The wireless device of claim 7 wherein the root protocol comprises the air interface protocol for the cellular network.

9. Computer readable media embodying a program of instructions executable by a processor in a wireless device having a user interface and a transceiver configured to communicate with either one of two networks over a wireless medium, each of the two networks having a different air interface protocol and one of the different air interface protocols being configured as a root protocol, the program of instructions being executable by the processor to perform a method comprising:

selecting either one of the two networks for wireless communications with the transceiver;

communicating between the transceiver and the selected network using the air interface protocol for the selected network; and communicating between the transceiver and the user interface using the root protocol of the user interface regardless of the air interface protocol used for communication with the selected network;

wherein the communicating between the transceiver and the selected network further comprises tunneling root protocol communications between the user interface and the selected network using the air interface protocol for the selected network.

10. The computer readable media of claim 9 wherein the user interface includes a keypad and display, the method further comprising supporting a plurality of network services accessible in substantially the same way by a user through the keypad and display regardless of the network selected.

11. The computer readable media of claim 10 wherein access to at least some of the network services is provided by presenting one or more menus to the display, the format of the one or more menus being substantially the same regardless of the network selected, and wherein the user is allowed to navigate through the one or more menus using the user interface in substantially the same way regardless of the network selected.

12. The computer readable media of claim 9 wherein the root protocol comprises the air interface protocol for one of the networks.

13. The computer readable media of claim 9 wherein the communications with the transceiver and user interface comprises translating communications between the root protocol of the user interface and the air interface protocol of the selected network.

14. The computer readable media of claim 9 wherein tunneling root protocol communications further comprises encapsulating communications from the user interface in the air interface protocol for the selected network for transmission to the selected network and stripping headers from received communications from the selected network before providing the received communications to the user interface.

15. A method of a communication at a wireless device with respect to multiple networks, comprising:

communicating with either one of two networks for wireless communications by a transceiver of the wireless device, wherein the transceiver is operable to communicate with either one of the two networks over a wireless medium, wherein each of the two networks have a different air interface protocol and wherein one of the different air interface protocols is configured as a root protocol;

processing communications between the transceiver and the selected network using the air interface protocol for the selected network, processing communications between the transceiver and a user interface of the wireless device using the root protocol of the user interface regardless of the air interface protocol used for communication with the selected network; and tunneling root protocol communications between the user interface and the selected network using the air interface protocol for the selected network.

16. The method of claim 15, wherein the wireless device includes a keypad and display, further comprising configuring the user interface software to support a plurality of network services to be accessible in substantially the same way by a user through the keypad and display regardless of the network.

17. The method of claim 16, wherein the configuring further comprises providing access to at least some of the network services by presenting one or more menus to the display, the format of the one or more menus being substantially the same regardless of the network, and further comprising allowing the user to navigate through the one or more menus using the user interface in substantially the same way regardless of the network.

18. The method of claim 15, wherein processing communications between the transceiver and the user interface using the root protocol of the user interface further comprises communicating with the air interface protocol for one of the networks as the root protocol.

19. The method of claim 15, wherein processing communications between the transceiver and the user interface using the root protocol of the user interface further comprises translating the communications between the root protocol of the user interface and the air interface protocol of the selected network.

20. The method of claim 15, wherein tunneling root protocol communications further comprises encapsulating communications from the user interface in the air interface protocol for the selected network for transmission to the selected network and stripping headers from received communications from the selected network before providing the received communications to the user interface.

21. The method of claim 15, wherein communicating further comprises communicating with a cellular network having a cellular coverage region or a wireless LAN in the cellular coverage region.

22. The method of claim 21, wherein processing communications between the transceiver and the user interface using the root protocol of the user interface further comprises using the air interface protocol for the cellular network as the root protocol.

23. A wireless device capable of communicating with multiple networks, comprising:

means for communicating with either one of two networks for wireless communications, wherein the means for communicating is operable to communicate with either one of the two networks over a wireless medium, wherein each of the two networks have a different air interface protocol and wherein one of the different air interface protocols is configured as a root protocol;

means for processing communications between the means for communicating and the selected network using the air interface protocol for the selected network, means for processing communications between the means for communicating and a user interface of the wireless device using the root protocol of the user interface regardless of the air interface protocol used for communication with the selected network; and means for tunneling root protocol communications between the user interface and the selected network using the air interface protocol for the selected network.

24. The wireless device of claim 23, wherein the wireless device includes a keypad and display, further comprising means for supporting a plurality of network services to be accessible in substantially the same way by a user through the keypad and display regardless of the network.

25. The wireless device of claim 24, further comprising means for providing access to at least some of the network services by presenting one or more menus to the display, the format of the one or more menus being substantially the same regardless of the network, and further comprising allowing the user to navigate through the one or more menus using the user interface in substantially the same way regardless of the network.

26. The wireless device of claim 23, wherein the means for processing communications between the means for communicating and the user interface using the root protocol of the user interface further comprises means for communicating with the air interface protocol for one of the networks as the root protocol.

27. The wireless device of claim 23, wherein the means for processing communications between the means for communicating and the user interface using the root protocol of the user interface further comprises means for translating the communications between the root protocol of the user interface and the air interface protocol of the selected network.

28. The wireless device of claim 23, wherein the means for tunneling root protocol communications further comprises means for encapsulating communications from the user interface in the air interface protocol for the selected network for transmission to the selected network and means for stripping headers from received communications from the selected network before providing the received communications to the user interface.

29. The wireless device of claim 23, wherein the means for communicating further comprises communicating with a cellular network having a cellular coverage region or a wireless LAN in the cellular coverage region.

30. The wireless device of claim 29, wherein the means for processing communications between the means for communicating and the user interface using the root protocol of the user interface further comprises means for using the air interface protocol for the cellular network as the root protocol.

31. A processor capable of communicating with multiple networks, comprising:

a first module for communicating with either one of two networks for wireless communications, wherein the means for communicating is operable to communicate with either one of the two networks over a wireless medium, wherein each of the two networks have a different air interface protocol and wherein one of the different air interface protocols is configured as a root protocol;

a second module for processing communications between the first module and the selected network using the air interface protocol for the selected network, a third module for processing communication between the first module and a user interface of the wireless device using the root protocol of the user interface regardless of the air interface protocol used for communication with the selected network; and a fourth module for tunneling root protocol communications between the user interface and the selected network using the air interface protocol for the selected network.

32. The processor of claim 31, wherein the wireless device includes a keypad and display, further comprising a fifth module for supporting a plurality of network services to be accessible in substantially the same way by a user through the keypad and display regardless of the network.

33. The processor of claim 32, further comprising a sixth module for providing access to at least some of the network services by presenting one or more menus to the display, the format of the one or more menus being substantially the same regardless of the network, and further comprising allowing the user to navigate through the one or more menus using the user interface in substantially the same way regardless of the network.

34. The processor of claim 31, wherein the third module for processing communications between the first module and the user interface using the root protocol of the user interface is further configured for communicating with the air interface protocol for one of the networks as the root protocol.

35. The processor of claim 31, wherein the third module for processing communications between the first module and the user interface using the root protocol of the user interface is further configured for translating the communications between the root protocol of the user interface and the air interface protocol of the selected network.

36. The processor of claim 31, wherein the fourth module for tunneling root protocol communications is further configured for encapsulating communications from the user interface in the air interface protocol for the selected network for transmission to the selected network and for stripping headers from received communications from the selected network before providing the received communications to the user interface.

37. The processor of claim 31, wherein the first module is further configured for communicating with a cellular network having a cellular coverage region or a wireless LAN in the cellular coverage region.

38. The processor of claim 37, wherein the third module for processing communications between the first module and the user interface using the root protocol of the user interface is further configured for using the air interface protocol for the cellular network as the root protocol.

\* \* \* \* \*

UNITED STATES PATENT AND TRADEMARK OFFICE
CERTIFICATE OF CORRECTION

| | | |
|---|---|---|
| PATENT NO. | : 7,801,555 B2 | Page 1 of 1 |
| APPLICATION NO. | : 11/187775 | |
| DATED | : September 21, 2010 | |
| INVENTOR(S) | : Jain et al. | |

It is certified that error appears in the above-identified patent and that said Letters Patent is hereby corrected as shown below:

Column 08, line 46, claim 2: "include" to read as --includes--

Column 08, line 67, claim 6: "interface, in" to read as --interface in--

Signed and Sealed this
Twelfth Day of July, 2011

David J. Kappos
*Director of the United States Patent and Trademark Office*